(12) United States Patent
Kawamoto

(10) Patent No.: US 7,626,775 B2
(45) Date of Patent: Dec. 1, 2009

(54) LENS DRIVE APPARATUS

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/253,578

(22) Filed: Oct. 17, 2008

(65) Prior Publication Data

US 2009/0059399 A1 Mar. 5, 2009

Related U.S. Application Data

(63) Continuation of application No. PCT/JP2007/058300, filed on Apr. 17, 2007.

(30) Foreign Application Priority Data

Apr. 21, 2006 (JP) .............................. 2006-118278

(51) Int. Cl.
*G02B 7/02* (2006.01)
(52) U.S. Cl. ...................................... 359/823
(58) Field of Classification Search .................. 359/823
See application file for complete search history.

(56) References Cited

U.S. PATENT DOCUMENTS

| 4,779,114 | A | | 10/1988 | Kobayashi |
| 5,950,021 | A | * | 9/1999 | Suzuki et al. ................. 396/87 |
| 2009/0174956 | A1 | * | 7/2009 | Kawamoto ................... 359/823 |

FOREIGN PATENT DOCUMENTS

| JP | 61-255330 | | 11/1986 |
| JP | 2-178640 | | 7/1990 |
| JP | 4-130098 | | 11/1992 |
| JP | 5-61713 | | 8/1993 |
| JP | 9-318863 | | 12/1997 |
| JP | 2006-106138 | A1 | 4/2006 |

OTHER PUBLICATIONS

Office Action issued against the corresponding Japanese patent application dated Oct. 21, 2008—Notification of Reasons for Refusal with English translation, No. 2006-118278.
International Search Report for International Application No. PCT/JP2007/058300 dated Jul. 11, 2007.

* cited by examiner

*Primary Examiner*—Jordan M. Schwartz
*Assistant Examiner*—James C Jones
(74) *Attorney, Agent, or Firm*—Kratz, Quintos & Hanson, LLP

(57) ABSTRACT

A lens drive apparatus includes a lens holder holding a lens, a gear rotated by rotational force of a driving source, and a cam gear meshed with the gear. The lens holder is moved in an optical path direction by the cam gear. The lens holder has an engagement portion engaged with a cam portion of the cam gear and is arranged to move in response to a change in the cam portion in conjunction with the rotation of the cam gear. The cam gear has a teeth portion composed of plural teeth arranged in a circular shape. The teeth portion has an non-meshed portion not meshed with the gear and thicker than other teeth. The number of the pluses or the number of the rotation of the driving source is preset, whereby a position of the lens holder is recognized.

2 Claims, 4 Drawing Sheets

LENS DRIVE APPARATUS

CROSS-REFERENCE TO RELATED INVENTION

This application is a continuation of and claims priority to International Patent Application No. PCT/JP2007/058300 filed on Apr. 17, 2007, which claims priority to Japanese Patent Application No. 2006-118278 filed on Apr. 21, 2006, subject matter of these patent documents is incorporated by reference herein in its entirety.

BACKGROUND OF THE INVENTION

1. Field of the Invention

The present invention relates to a lens drive apparatus built in an image pickup apparatus. More specially, the present invention relates to a lens drive apparatus which moves a lens in an optical axis direction by use of a cam member.

2. Description of the Related Art

Recently, an image pickup apparatus, such as a still camera or a camera built in a mobile phone, has been smaller in size significantly. There is such an image pickup apparatus which includes a lens drive apparatus moving a lens to a focused point in accordance with the position of the object. Thus, the lens drive apparatus which has a smaller size and a high focus accuracy is required.

Document 1 (Japanese Utility Model Application Publication No. 5-61713) discloses a lens drive mechanism which moves a lens in the optical axis direction by use of a cam member. In this lens drive mechanism, the lens can be driven with a simple structure having a cam member. Further, this lens drive mechanism has plural switches for detecting a position of the cam member. The lens drive mechanism recognizes the initial position or a partway position by using these switches, thereby adjusting the focus with high accuracy. More specially, this lens drive mechanism has a mechanical switch for detecting the initial position of the cam, and a photo interrupter (optical switch) for detecting a substantial middle position of driving range of the cam so as to detect the position of the cam.

The above lens drive mechanism disclosed in Document 1 has a simple structure, since the cam structure drives the lens. However, the above lens drive mechanism detects the position of the cam member by using the plural switches. This requires a space for arranging the switches within the mechanism, thus enlarging the structure of the lens drive mechanism. In accordance with this, plural expensive switches are used, thereby causing a problem of increase in the manufacturers' cost.

SUMMARY OF THE INVENTION

It is therefore an object of the present invention to provide a lens drive apparatus which has a smaller size and a lower cost.

According to an aspect of the present invention, there is provided a lens drive apparatus including a lens holder holding a lens, a gear rotated by rotational force of a driving source, and a cam gear meshed with the gear, wherein: the lens holder is moved in an optical path direction by the cam gear; the lens holder has an engagement portion engaged with a cam portion of the cam gear and is arranged to move in response to a change in the cam portion in conjunction with the rotation of the cam gear; the cam gear has a teeth portion composed of plural teeth arranged in a circular shape, and the teeth portion has an non-meshed portion not meshed with the gear and thicker than other teeth.

In the lens drive apparatus according to an embodiment of the present invention, since the teeth, transmitting rotational force, and the non-meshed portion, not meshed with the gear are provided in the teeth portion, the cam gear is stopped forcibly at a predetermined position. Herein, if the above stop position is preset to be associated with an initial position or a terminal position of the lens holder, and the number of the pluses or the number of the rotation of the driving source, for moving the lens holder from the initial position to the terminal position, is preset, a position of the lens holder is recognized. Therefore, unlike a conventional one, it is possible to move the lens holder to the focused point while its position is being recognized without a switch. Consequently, according to an aspect of the present invention, there is provided the lens drive apparatus which has a smaller size and a lower cost by simplifying the internal structure thereof and focuses the lens with high accuracy.

Further, the cam gear may be provided with the teeth portion at a periphery of a disc-shaped base member thereof, and may be provided with a cam surface, serving as the cam portion, in a spiral shaped at one side thereof, and the engagement portion of the lens holder may be in contact with the cam surface by a biasing member.

DETAILED DESCRIPTION

Figure 1:
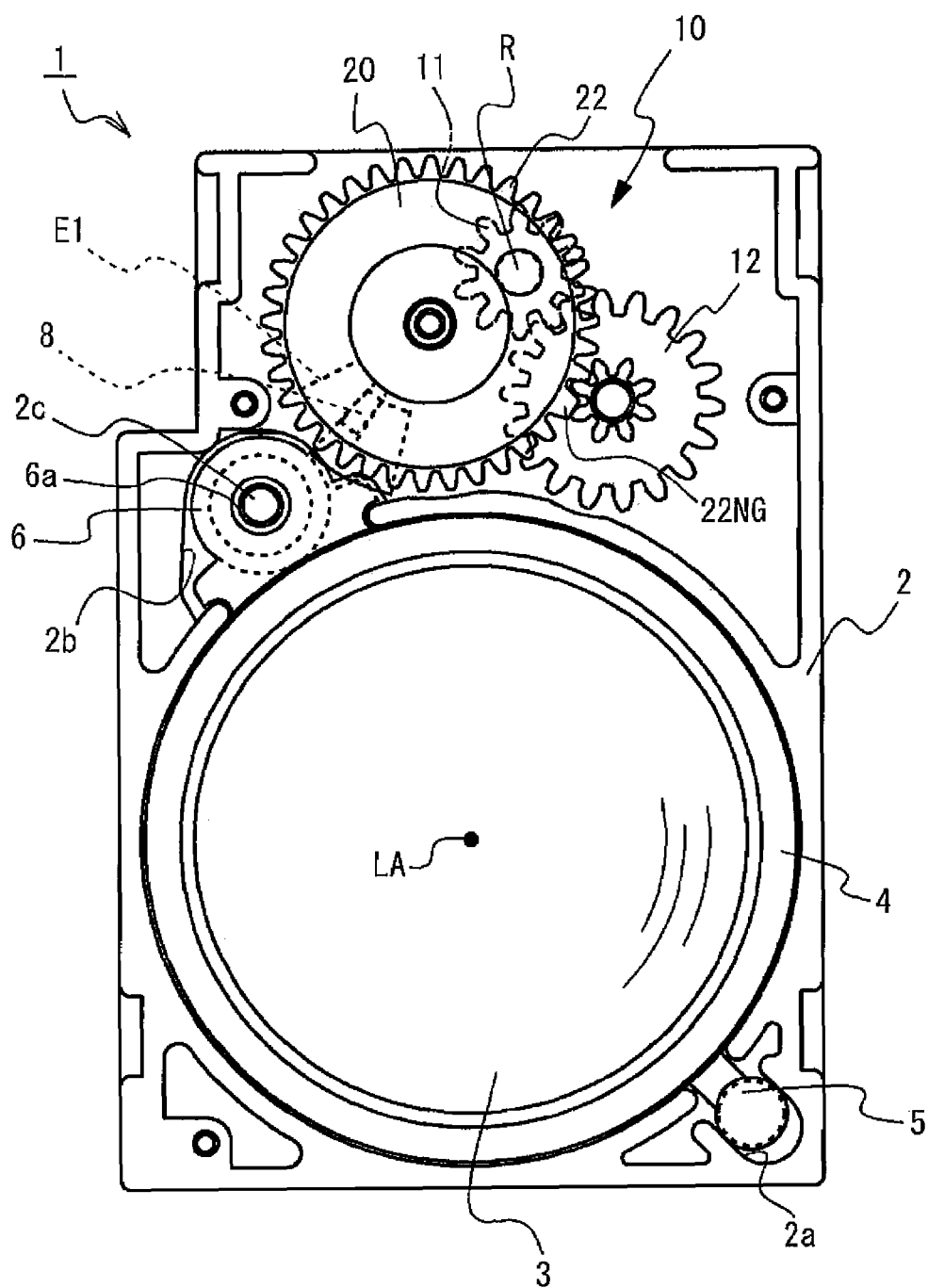
FIG. 1 is a plane view showing a lens drive apparatus according to an embodiment of the present invention.
Figure 2:
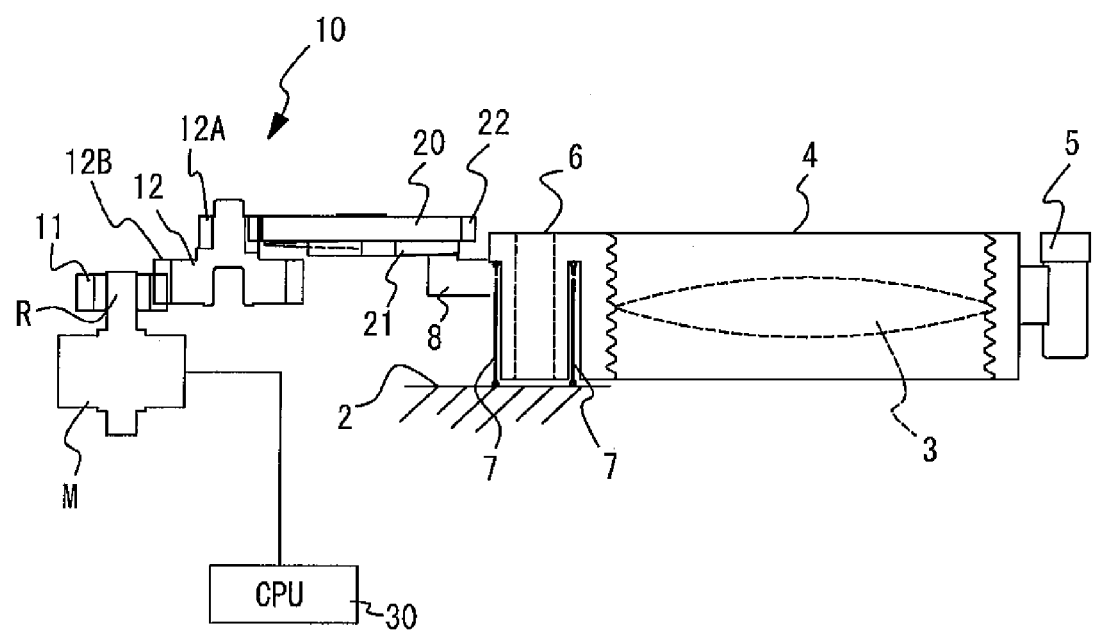
FIG. 2 is a side view showing an essential part of the lens drive apparatus shown in FIG. 1.

An embodiment of the present invention will be described below with reference to drawings. FIG. 1 is a plane view showing a lens drive apparatus according to an embodiment of the present invention. FIG. 2 is a side view showing an essential part of the lens drive apparatus shown in FIG. 1. In order to recognize the positional relationships among configuration parts, FIG. 2 shows a expanded view of each position of parts behind other parts. The lens drive apparatus 1 will be described with reference to FIGS. 1 and 2.

The lens drive apparatus 1 has a basal plate 2 on which various parts to be mentioned below are mounted. A lens holder 4 holding a lens 3 is arranged for movement in the optical path direction LA perpendicular to a plane surface of the basal plate 2. Specifically, the lens holder 4 has guiding portions 5 and 6 extending radially outward. Each end of guiding portions 5 and 6 is formed into a columnar shape. The basal plate 2 has receiving portions 2a and 2b for receiving cylindrical portions of the above guiding portions 5 and 6 respectively. Additionally, the basal plate 2 has a guiding pin 2c standing at a center portion of the receiving portion 2b. The guiding pin 2c inserts into hole portion 6a formed in the cylindrical portion of the guiding portion 6. With such a configuration, the lens holder 4 is arranged to move in the optical path direction LA.

Referring now to FIG. 2, a coil spring 7, serving as a biasing member, is inserted onto the guiding portion 6 in such a manner to surround the cylindrical portion of the guiding portion 6 formed in the lens holder 4. The lens holder 4 is biased upwardly by this coil spring 7. Further, the above lens holder 4 has an arm portion 8, serving as a engagement portion, extending to an outward of the lens holder 4. Since the lens holder 4 is biased upwardly in FIG. 2 by the coil spring 7, the arm portion 8 also is biased upwardly in FIG. 2. This biasing force brings the arm portion 8 to be in contact with a cam surface 21 of a cam gear 20 to be mentioned later.

Further, referring to FIGS. 1 and 2, a configuration of a drive mechanism 10 for moving the lens holder 4 in the optical path direction LA will be described.

The drive mechanism 10 has a stepping motor M serving as a driving source. This stepping motor M is controlled by a central processing unit 30 (hereinafter referred to as CPU 30), and is rotated in response to a driving signal pulse outputted from the CPU 30. For example, the stepping motor M is rotated at a predetermined number of rotations in response to a predetermined number of the driving signals supplied from the CPU 30. A gear 11 is fitted onto a rotor shaft R of the stepping motor M and is coupled to the cam gear 20 via an idle gear 12.

A base member of the cam gear 20 has a disc shape, likewise a general gear. The cam gear 20 is provided with a teeth portion 22, composed of plural teeth arranged in a circular shape, at a periphery (peripheral edge) thereof. In addition, the cam gear 20 has the cam surface 21, having a spiral shape, at one surface thereof. In this embodiment, the cam surface 21 is formed at a bottom surface of the cam gear 20. The cam surface 21 is in contact with the arm portion 8, which has been mentioned above, of the lens holder 4.

Figure 3:
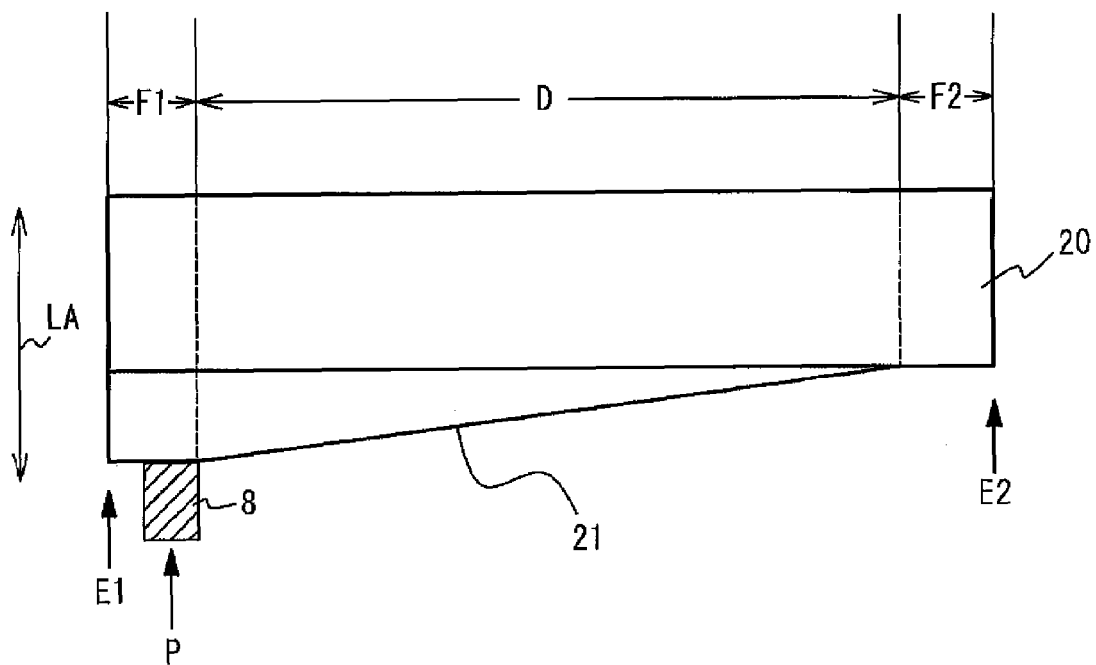
FIG. 3 is a schematic view showing an expanded side of a cam gear.

FIG. 3 is a schematic view showing an expanded side of the cam gear 20. As shown in FIG. 3, the cam surface 21 includes a slope region D and plane regions F1 and F2 located at one and the other ends of the slope region D, respectively. The actual cam surface has a spiral shape in such a way that ends E1 and E2 are connected to each other. This defines a step at a position, of the cam gear 20, indicated by the end E1. In addition, the end E1 and the plane region F1 of the cam surface 21 as shown in FIG. 3 correspond to the infinity position, in the initial position side, to which the focal point of the lens 3 is brought. Moreover, the end E2 and the plane region F2, correspond to the closest position in the focal point of the lens 3 on the terminal position side. Also, when the arm portion 8 is in contact with the slope region D of the cam surface 21, the lens holder 4 moves in the optical path direction LA.

Since the arm portion 8 is biased to be in contact with such configured cam surface 21, the cam gear 20 is rotated by a rotational force applied from the stepping motor M, whereby the arm portion 8 moves over the cam surface 21. Consequently, the lens holder 4 having the arm portion 8 moves in the optical path direction LA within a predetermined range (range of the slope region D). As a result, the controlling of the stepping motor M allows the lens holder 4 to move from the initial position to the terminal position through the focused point.

Figure 4A:
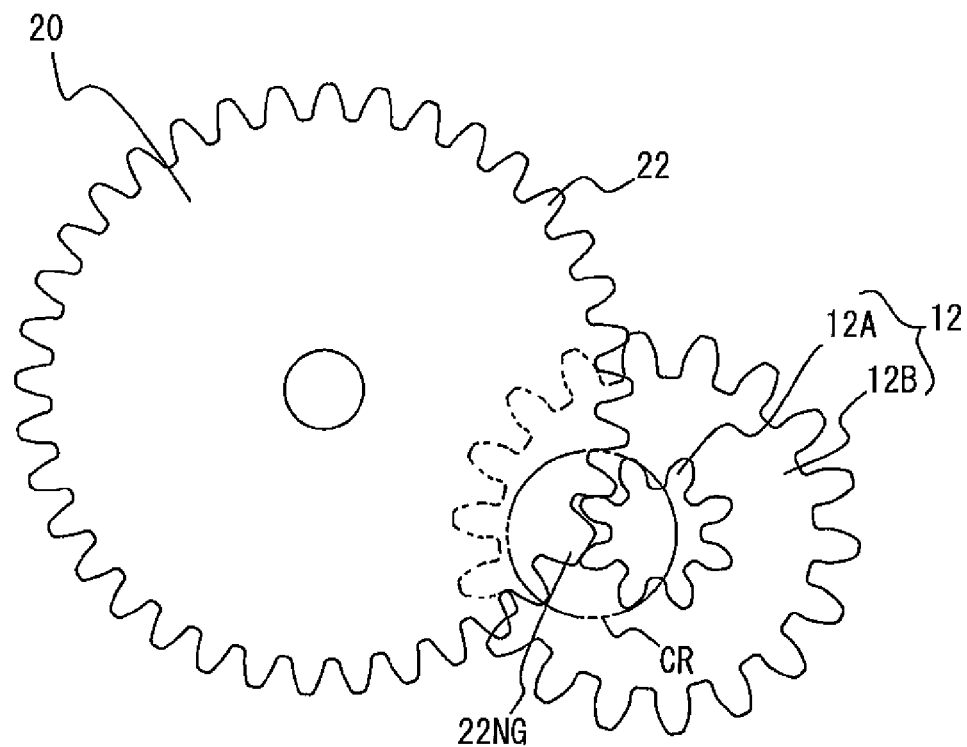
FIG. 4A is a view showing the cam gear and a idle gear shown in FIG. 1.
Figure 4B:
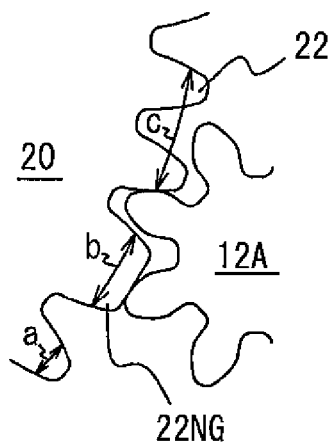
FIG. 4B is an enlarged view showing an inside of a circle CR shown in FIG. 4A.

Furthermore, the lens drive apparatus 1 according to the embodiment of the present invention has a configuration for determining a moved position of the lens holder 4. This configuration will be described with reference to FIG. 4A lens holder 4. This configuration will be described with reference to FIGS. 4A and 4B. FIG. 4A is a view showing the cam gear cam gear 20 and the idle gear 12 shown in FIG. 1, and FIG. 4B is an enlarged view showing an inside of a circle CR shown in FIG. 4A.

The idle gear 12 includes two gears arranged concentrically with each other. A gear 12A, a smaller one in FIG. 4A, is meshed with the teeth portion 22 formed in the periphery of the cam gear 20. A gear 12B, a bigger one in FIG. 4A, is meshed with the gear 11 (see FIG. 1) fitted onto the rotor shaft R of the stepping motor M. The teeth portion 22 of the cam gear 20 is provided with a non-meshed portion 22NG not meshed with the gear 12A. The non-meshed portion 22NG is one tooth thicker than the other teeth. The number of teeth of the cam gear 20 is not an integer, but a decimal. The non-meshed portion 22NG is located at such a position where a part corresponding to one circular pitch cannot be formed correctly. Therefore, as shown in FIG. 4B, the non-meshed portion 22NG is formed such that two teeth are combined by burying the tooth groove. This configuration is thinner than a tooth formed by two teeth other than the non-meshed portion 22NG. That is to say, a tooth thickness b of the non-meshed portion 22NG is about 0.3 to less than 1.0 times as thickness as a tooth thickness c of the tooth formed with two teeth other than the non-meshed portion 22NG. About 0.5 times is preferable. Supposing that the non-meshed portion 22NG is considered to be one tooth, the tooth thickness b of the non-meshed portion 22NG is about 1.3 to less than 3.0 times as thickness as the tooth thickness a of the other teeth. About 1.5 times is preferable.

As mentioned above, the non-meshed portion 22NG is formed in the teeth portion 22 of the cam gear 20. As a result, when the idle gear 12 is rotated in one direction and the gear 12A is in contact with the non-meshed portion 22NG, the cam gear 20 is stopped forcibly. Likewise, even when the idle gear 12 is rotated in the inverse direction, the gear 12A comes into contact with the non-meshed portion 22NG, so that the cam gear 20 is stopped forcibly. That is to say, the cam gear 20 is rotated within a range less than one rotation (corresponding to a range where the length of the non-meshed portion 22NG is subtracted from the length of one rotation).

Herein, if the positions of both ends in which the cam gear 20 is stopped forcibly is preset to be respectively associated with the initial position and the terminal position of the above lens holder 4, the cam gear 20 is stopped forcibly at the initial position and the terminal position, respectively. That is to say, when the cam gear 20 is rotated in one direction and stopped, the lens holder 4 is cam gear 20 is rotated in its reverse direction and stopped, the lens holder 4 is positioned at the initial position or the terminal position The CPU 30 determines the rotational direction of the stepping motor M, and this allows to determine whether the lens holder 4 is stopped at the initial position or the terminal. Therefore, the lens drive apparatus 1 according to the embodiment off the present invention easily determines the initial position or the terminal position of the lens holder 4 without the provision of a switch.

More specially, the CPU 30 determines the rotational number of the stepping motor M required for movement from the initial position to the terminal position, then the CPU 30 may preset the number of the driving pluses outputted from the CPU 30 to the stepping motor M. For example, if 1000 pluses are outputted from the CPU 30 to the stepping motor M, the configuration is designed such that the stepping motor M is rotated a predetermined number and the lens holder 4 moves from the initial position to the terminal position.

Consequently, for example, when the lens holder 4 is moved from the initial position to the terminal position, only the operation of the 1000 pluses outputted to the stepping motor M from the CPU 30 can complete the movement. In view of this action of the cam gear 20, the cam gear 20 is rotated by a range of less than one rotation, and the non-meshed portion 22NG comes into contact with the gear 12A, whereby the cam gear 20 is stopped forcibly. Additionally, in light of gears backlash or assembly margin, it is a preferable that a predetermined margin be applied to the number of the driving pulses outputted from the CPU 30 to the stepping motor M. That is to say, in design, in the case where the lens holder 4 is allowed to move from the initial position to the terminal position by the 1000 pluses, it is a preferable that the non-meshed portion 22 NG securely come into contact with the gear 12A by additionally outputting 4 or 5 pulses. This securely moves the lens holder 4 from the initial position to the terminal position.

When the lens holder 4 moves between the initial position and the terminal position so as to adjust the focus of the lens 3, the position of the lens holder 4 can be recognized by the number of the driving pluses outputted from the CPU 30 with the initial position or the terminal position served as a basis. Therefore, this eliminates a switch for recognizing a partway position of the lens holder 4. In addition, when the lens holder 4 is moved from the partway position to the initial position or the terminal position, it is preferable that a predetermined margin be applied to the number of the driving pulses, as described above. This configuration recognizes the current position of the lens holder 4 on the basis of the initial position or the terminal position with high accuracy. This permits the lens 3 to move to the focal position with high accuracy.

In the lens drive apparatus 1 as mentioned heretofore, the non-meshed portion 22NG is provided in the teeth portion 22 of the cam gear 20, whereby the cam gear 20 rotates by a predetermined range and is then stopped forcibly. The position where the cam gear 20 is stopped forcibly is associated with the initial position or the terminal position, thus eliminating the need for a switch for detecting the initial position or the terminal position of the lens holder 4. Additionally, with a simple structure that the non-meshed portion 22NG is provided in a part of the teeth portion 22 of the cam gear 20, downsizing and simplification of the structure is promoted, thus reducing the manufacture cost.

In addition, the forcible stopping eliminates the consideration of a play between the gears or the like, and minimizes length of the plane regions F1 and F2 on the cam surface 21, which is smaller than that of a conventional one. In the case where the position is detected by a switch, the arm portion 8 might move beyond the end E1 and fall to the end E2. Therefore, the plane regions F1 and F2 are conventionally designed such that the sum is a minimal length plus a marginal one. This is because when the arm portion 8 falls to the end E2, the position of the rotor at this time misaligns its original terminal position (end E2) and is different from the designed position. In such a case, even if the CPU 30 causes the arm portion 8 to move form the terminal position to the initial position, stop position of the rotor at the initial position misaligns with respect to its original stop position. Therefore, the control of the rotor from the initial position is difficult. Further, as mentioned above, the non-meshed portion 22NG is smaller than a tooth formed to bury adjacent teeth, whereby the plane regions F1 and F2 can be set to be narrow, and the slope region D can be set to be broad. As a result, it is possible to improve the focus accuracy, and to reduce the load applied on the arm portion 8 to smoothly move the lens holder 4.

Additionally, in the above embodiment, the cam gear 20 has the cam surface 21 at the one side thereof, and the cam surface 21 is in contact (engagement) with the arm portion 8 of the lens holder 4 by the biasing force of the coil spring 7. Although the cam surface 21 of the cam gear 20 corresponds to the cam portion, in the above embodiment, the present invention is not limited to this structure. There may be additionally provided a cylindrical body which rotates in conjunction with the cam gear 20 and which has a cam groove on a body portion (side peripheral portion) of the cylindrical body, so that this cam groove may be engaged with the arm portion 8 to drive the lens holder 4 in the same manner as described above. In this case, the cam groove serves as the cam portion.

While the preferred embodiment of the present invention have been illustrated in detail, the present invention is not limited to the above-mentioned embodiment, and other embodiments, variations and modifications may be made without departing from the scope of the present invention. In the above embodiment, although the idle gear 12 is located between the cam gear 20 and the gear 11 fitted onto the rotor shaft R of the stepping motor M, the present invention is not limited to this structure. Another gear may be located between the gear 11 and the cam gear 20 as needed. Alternatively, the gear 11 and the cam gear 20 may be directly meshed with each other as needed.

What is claimed is:

1. A lens drive apparatus comprising:
   a lens holder holding a lens;
   a gear rotated by rotational force of a driving source; and
   a cam gear meshed with the gear,
   wherein:
   the lens holder is moved in an optical path direction by the cam gear;
   the lens holder has an engagement portion engaged with a cam portion of the cam gear and is arranged to move in response to a change in the cam portion in conjunction with the rotation of the cam gear;
   the cam gear has a teeth portion composed of plural teeth arranged in a circular shape; and
   the teeth portion has an non-meshed portion not meshed with the gear and thicker than other teeth.

2. The lens drive apparatus according to claim 1, wherein the cam gear is provided with the teeth portion at a periphery of a disc-shaped base member thereof, and is provided with a cam surface, serving as the cam portion, in a spiral shaped at one side thereof, and
   the engagement portion of the lens holder is in contact with the cam surface by a biasing member.

* * * * *